United States Patent
Haas et al.

(10) Patent No.: US 12,241,398 B2
(45) Date of Patent: Mar. 4, 2025

(54) AFTERTREATMENT SYSTEM NOx AND AMMONIA CONTROL STRATEGY

(71) Applicant: Cummins Inc., Columbus, IN (US)

(72) Inventors: Michael Haas, Columbus, IN (US); Adam W. Kidd, Indianapolis, IN (US); Oxford Peng, Columbus, IN (US); Shahidur M. Rahman, Columbus, IN (US); Ananth Vemuri, Columbus, IN (US); Christophe Tricaud, Columbus, IN (US); Easwar Yarrabikki, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/268,054

(22) PCT Filed: Dec. 17, 2021

(86) PCT No.: PCT/US2021/064023
§ 371 (c)(1),
(2) Date: Jun. 16, 2023

(87) PCT Pub. No.: WO2022/133206
PCT Pub. Date: Jun. 23, 2022

(65) Prior Publication Data
US 2024/0052766 A1    Feb. 15, 2024

Related U.S. Application Data

(60) Provisional application No. 63/199,307, filed on Dec. 18, 2020.

(51) Int. Cl.
*F01N 3/20* (2006.01)
*F01N 3/10* (2006.01)
(Continued)

(52) U.S. Cl.
CPC ............ *F01N 3/208* (2013.01); *F01N 3/108* (2013.01); *F01N 3/2066* (2013.01); *F01N 9/005* (2013.01);
(Continued)

(58) Field of Classification Search
CPC .......... F01N 3/021; F01N 3/108; F01N 3/208; F01N 3/2066; F01N 9/005; F01N 9/007;
(Continued)

(56) References Cited

U.S. PATENT DOCUMENTS 9,297,287 B2 * 3/2016 Hirota .................. F01N 3/08
9,441,519 B2   9/2016 Haas et al.
(Continued)

FOREIGN PATENT DOCUMENTS

CN   109944666 A   6/2019
CN   110211643 A   9/2019
(Continued)

OTHER PUBLICATIONS

International Search Report and Written Opinion for International Application No. PCT/US2021/064023 mailing date Mar. 11, 2022, 12 pages.
European Search Report and Written Opinion on EPO Appl. No. 21907890.4 mailing date Oct. 2, 2024, 9 pages.

*Primary Examiner* — Binh Q Tran
(74) *Attorney, Agent, or Firm* — Foley & Lardner LLP

(57) ABSTRACT

A system includes an aftertreatment system and a controller coupled to the aftertreatment system. The controller is configured to generate a spatially resolved model of a catalyst of the aftertreatment system. The controller is further configured to adjust the spatially resolved model based on one or more sensed values from at least one sensor upstream of the one or more portions and at least one sensor downstream of the one or more portions.

18 Claims, 6 Drawing Sheets

(51) Int. Cl.
*F01N 9/00* (2006.01)
*F01N 11/00* (2006.01)
*F01N 13/00* (2010.01)

(52) U.S. Cl.
CPC .......... *F01N 13/0093* (2014.06); *F01N 9/007* (2013.01); *F01N 11/002* (2013.01); *F01N 11/007* (2013.01); *F01N 2610/02* (2013.01); *F01N 2900/04* (2013.01); *F01N 2900/0402* (2013.01); *F01N 2900/0406* (2013.01); *F01N 2900/0412* (2013.01); *F01N 2900/0418* (2013.01); *F01N 2900/0601* (2013.01)

(58) Field of Classification Search
CPC ...... F01N 11/00; F01N 11/002; F01N 11/005; F01N 11/007; F01N 13/0093; F01N 2560/026; F01N 2610/02; F01N 2900/04; F01N 2900/0402; F01N 2900/0406; F01N 2900/06; F01N 2900/0408; F01N 2900/0412; F01N 2900/0418; F01N 2900/0601; F01N 2900/08; F02D 2041/1411; F02D 2041/1423; F02D 2041/1425; F02D 2041/143; F02D 2041/1433; F02D 2041/1437
See application file for complete search history.

(56) References Cited

U.S. PATENT DOCUMENTS

| | | | |
|---|---|---|---|
| 10,087,805 | B2 | 10/2018 | Cho et al. |
| 10,927,738 | B2* | 2/2021 | Knopp .................... F01N 3/206 |
| 11,092,096 | B1* | 8/2021 | Sun ...................... F02D 41/1439 |
| 2004/0045282 | A1* | 3/2004 | Ide ...................... F02D 41/1479 |
| | | | 60/285 |
| 2004/0244363 | A1* | 12/2004 | Makki ................. F02D 41/0295 |
| | | | 60/285 |
| 2010/0111796 | A1 | 5/2010 | Caudle et al. |
| 2013/0064717 | A1* | 3/2013 | Masaki .................... F01N 3/18 |
| | | | 422/108 |
| 2017/0122159 | A1 | 5/2017 | Bahrami |
| 2017/0306827 | A1 | 10/2017 | Wu et al. |
| 2018/0230885 | A1 | 8/2018 | Khaled et al. |
| 2019/0301332 | A1 | 10/2019 | Clayton |
| 2021/0095590 | A1* | 4/2021 | Bastoreala .......... G01M 15/102 |

FOREIGN PATENT DOCUMENTS

| | | |
|---|---|---|
| DE | 10 2017 110 234 A1 | 11/2018 |
| EP | 2 339 136 A1 | 6/2011 |
| EP | 2 529 093 B1 | 12/2012 |
| WO | WO-2011/093771 A1 | 8/2011 |
| WO | WO-2012/110210 A1 | 8/2012 |

* cited by examiner

AFTERTREATMENT SYSTEM NOx AND AMMONIA CONTROL STRATEGY

CROSS-REFERENCE TO RELATED APPLICATION

This application claims the benefit of and priority to U.S. Provisional Application No. 63/199,307, filed Dec. 18, 2020, titled "AFTERTREATMENT SYSTEM NOx AND AMMONIA CONTROL STRATEGY," which is incorporated herein by reference in its entirety.

TECHNICAL FIELD

The present disclosure relates to systems and methods for dynamically managing and controlling an engine-exhaust gas aftertreatment system. In particular, the present disclosure relates to managing and controlling ammonia (i.e., reductant) and a system out NOx via an on-board integrated model of a controller for the system.

BACKGROUND

Exhaust aftertreatment systems are generally designed to reduce emissions of particulate matter, nitrogen oxides (NOx), hydrocarbons, and other environmentally harmful pollutants (e.g., greenhouse gases, sulfur oxides, etc.). Reduction of emissions is accomplished via a combination of catalysts within the aftertreatment system (e.g., an SCR catalyst) and of a reductant (e.g., ammonia) added to the exhaust gas stream. Injected reductant in the exhaust gas in the presence of certain catalysts react to convert harmful emissions to less environmentally harmful emissions (e.g., NOx to nitrogen and water). However, unused reductant can be released into the atmosphere or otherwise accumulate in the aftertreatment system (or other components) thereby adversely affecting the efficacy of the aftertreatment system.

SUMMARY

One embodiment relates to a system that includes an aftertreatment system and a controller coupled to the aftertreatment system. The controller is configured to generate a spatially resolved model a catalyst of the aftertreatment system. The controller is further configured to adjust the spatially resolved model based on one or more sensed values from at least one sensor upstream of the one or more portions and at least one sensor downstream of the one or more portions. By discretizing the catalyst into the portions and subsequent controls of components of the system (e.g., engine, aftertreatment system heater, and so on), the system is beneficially able to control emissions while managing reductant in the system (e.g., ammonia).

In some implementations, the controller is further configured to: compare one or more modeled values from the spatially resolved model to one or more desired values for the aftertreatment system; and in response to the comparison, command at least one of an engine, a heater, or a doser of the aftertreatment system to achieve the one or more desired values. In some implementations, the controller is further configured to: determine a gradient between the one or more sensed values from the at least one sensor upstream of the one or more portions and the one or more sensed values from the at least one sensor downstream of the one or more portions; and assign, based on the determined gradient, new modeled values to the one or more portions.

In some implementations, the controller is further configured to: compare one or more modeled values from the spatially resolved model to one or more desired values for the catalyst; and identify a fault in the aftertreatment system based on a difference between the one or more modeled values and the one or more desired values exceeding an error threshold. In some implementations, the catalyst is a Selective Catalytic Reduction (SCR) catalyst. In some implementations, the catalyst is a combination of a Selective Catalytic Reduction (SCR) catalyst and an Ammonia Oxidation Catalyst (AMOX). In some implementations, the catalyst is a first Selective Catalytic Reduction (SCR) catalyst, and the aftertreatment system includes a second SCR catalyst positioned upstream of the first SCR catalyst. The second SCR catalyst is relatively smaller than the first SCR catalyst. In some implementations, the system includes a first reductant doser fluidly coupled to the first SCR catalyst and a second reductant doser fluidly coupled to the second SCR catalyst. In some implementations, the controller is further configured to: control a dosing command for the first reductant doser based on one or more modeled values of a spatially resolved modeled for the first SCR catalyst and the second SCR catalyst. In some implementations, the one or more modeled values are indicative of an amount of stored ammonia for one or more portions of the first SCR catalyst and the second SCR catalyst, and the dosing command for the first reductant doser is based on a comparison of the one or more modeled values indicative of the amount of stored ammonia of the one or more portions of the first SCR catalyst and the second SCR catalyst to an ammonia storage threshold.

In some implementations, the controller is further configured to: control a dosing command for the second reductant doser based on one or more modeled values of a spatially resolved modeled for the first SCR catalyst and the second SCR catalyst. The one or more modeled values may be indicative of an amount of stored ammonia for one or more portions of the first SCR catalyst and the second SCR catalyst. The dosing command for the second reductant doser is based on a comparison of the one or more modeled values indicative of the amount of stored ammonia of the one or more portions of the first SCR catalyst and the second SCR catalyst to an ammonia storage threshold.

Another embodiment relates to a method. The method includes: generating, by a controller coupled to an aftertreatment system, a spatially resolved model of a catalyst of the aftertreatment system. The spatially resolved model divides the catalyst into one or more portions. The method further includes: adjusting, by the controller, the spatially resolved model based on one or more sensed values from at least one sensor upstream of the one or more portions and at least one sensor downstream of the one or more portions.

In some implementations, the method further includes: comparing, by the controller, one or more modeled values from the spatially resolved model to one or more desired values for the aftertreatment system; and in response to the comparison, commanding, by the controller, at least one of an engine, a heater, or a doser of the aftertreatment system to achieve the one or more desired values. In some implementations, adjusting the spatially resolved model comprises: determining, by the controller, a gradient between the one or more sensed values from the at least one sensor upstream of the one or more portions and the one or more sensed values from the at least one sensor downstream of the one or more portions; and assigning, by the controller, based on the determined gradient, new modeled values to the one or more portions.

In some implementations, the method further comprises: comparing, by the controller, one or more modeled values from the spatially resolved model to one or more desired values for the catalyst; and identifying, by the controller, a fault in the aftertreatment system based on a difference between the one or more modeled values and the one or more desired values exceeding an error threshold. In some implementations, the catalyst is a Selective Catalytic Reduction (SCR) catalyst.

Still another embodiment relates to a system. The system includes a processing circuit including at least one processor coupled to a memory. The memory stores instructions therein that, when executed by the at least one processor, cause the processing circuit to: generate a spatially resolved model of a catalyst of an aftertreatment system, the spatially resolved model dividing the catalyst into one or more portions; and adjust the spatially resolved model based on one or more sensed values from at least one sensor upstream of the one or more portions and at least one sensor downstream of the one or more portions. The instructions, when executed by the at least one processor, further cause the processing circuit to: compare one or more modeled values from the spatially resolved model to one or more desired values for the aftertreatment system; and in response to the comparison, command at least one of an engine, a heater, or a doser of the aftertreatment system to achieve the one or more desired values. The instructions, when executed by the at least one processor, further cause the processing circuit to: determine a gradient between the one or more sensed values from the at least one sensor upstream of the one or more portions and the one or more sensed values from the at least one sensor downstream of the one or more portions; and assign, based on the determined gradient, new modeled values to the one or more portions.

One embodiment relates to a controller coupled to an aftertreatment system, the controller configured to generate a spatially resolved model of a catalyst of the aftertreatment system, the spatially resolved model dividing the catalyst into one or more portions. The controller is configured to adjust the spatially resolved model based on one or more sensed values from at least one sensor upstream of the one or more portions and at least one sensor downstream of the one or more portions.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. In this regard, numerous specific details are provided to impart a thorough understanding of embodiments of the subject matter of the present disclosure. The described features of the subject matter of the present disclosure may be combined in any suitable manner in one or more embodiments and/or implementations. One or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Following below are more detailed descriptions of various concepts related to, and implementations of, methods, apparatuses, and systems for managing system-out NOx and ammonia via an on-board integrated model. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the Figures generally, the various embodiments disclosed herein relate to systems, apparatuses, and methods for managing system-out NOx (SONOx) and ammonia (particularly, ammonia slip) via an on-board integrated model of a controller. Exhaust aftertreatment systems are intended to treat exhaust gases and mitigate undesirable exhaust gas emissions, such as NOx emissions. Exhaust aftertreatment systems may include a diesel oxidation catalyst (DOC), a diesel particulate filter (DPF), a selective catalytic reduction (SCR) system, and among potentially other components, an ammonia slip (ASC) catalyst (or AMOX). As exhaust gas passes through these various components, harmful pollutants and particulates are removed from the exhaust gas. For example, the SCR may utilize a two-step process: a doser injects a reductant into the exhaust stream, and then the exhaust stream passes through a SCR catalyst that converts the exhaust gas into less harmful constituents that can be released into the atmosphere (particularly, conversion of NOx into less harmful compounds). However, if too much of this reductant (in one embodiment, ammonia) is present in the exhaust gas or on the SCR catalyst (i.e., in storage), the ammonia fails to completely react with the catalyst and is released into the atmosphere. "Ammonia slip" refers to the excess ammonia that does not react with the catalyst, which may build up in the aftertreatment system and/or be released into the atmosphere. Some aftertreatment systems include the AMOX in order to reduce any un-reacted ammonia in the exhaust, but these AMOX may not be completely effective. Further, in those embodiments in which the AMOX is omitted, proper management of the SCR and reductant is desired in order to reduce or eliminate the amount of ammonia slip. The systems, apparatuses, and methods of the present disclosure are operable to reduce an amount of ammonia slip while maintaining a desired level of NOx reduction.

Figure 1:
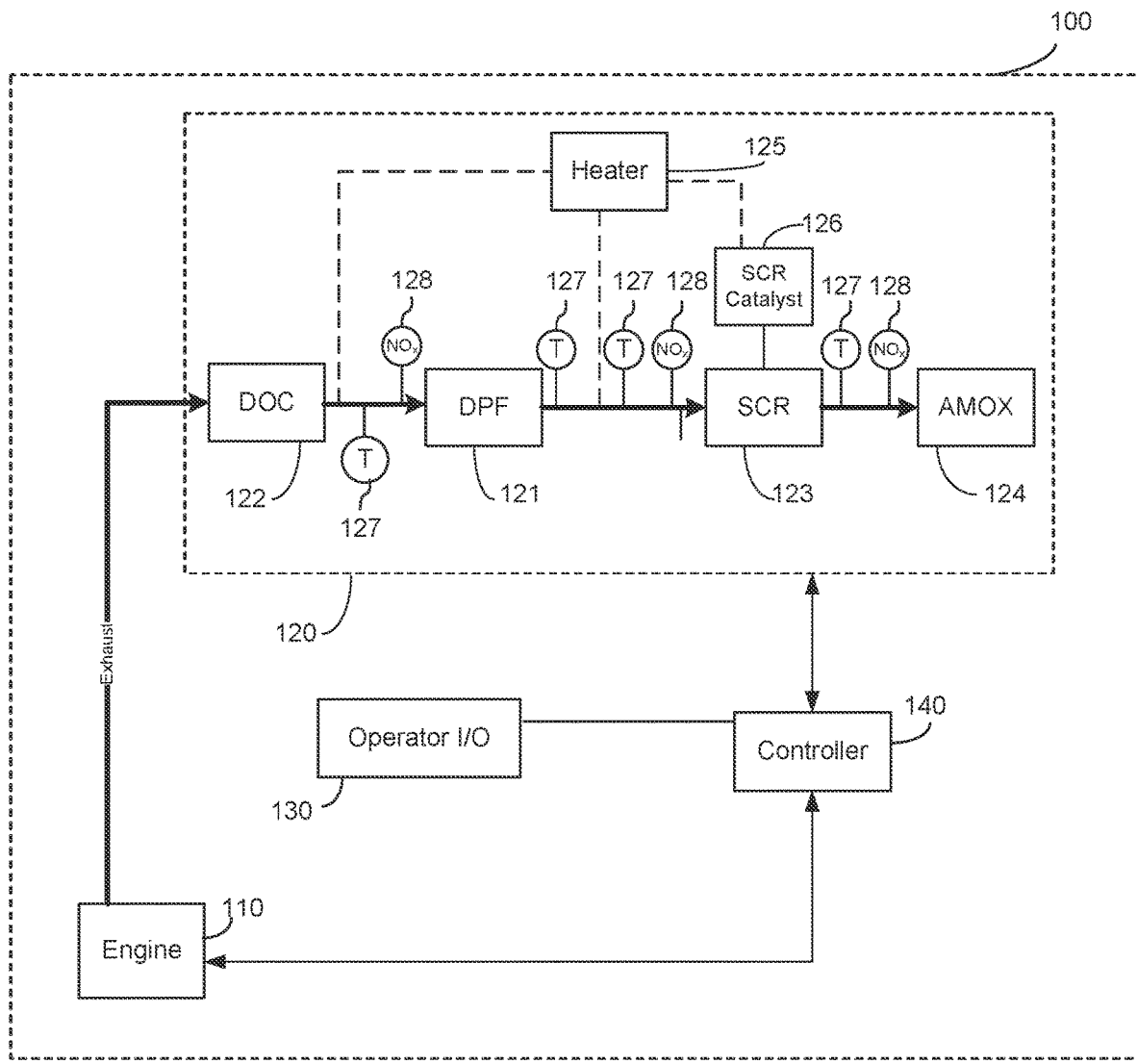
FIG. 1 is a schematic diagram of a system with a controller, according to an exemplary embodiment.

Referring now to FIG. 1, a system 100 is shown, according to an example embodiment. The system 100 includes an engine 110, an aftertreatment system 120, an operator input/output (I/O) device 130, and a controller 140, where the controller 140 is communicably coupled to each of the aforementioned components. In the configuration of FIG. 1, the system 100 is included in a vehicle. The vehicle may be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. In another embodiment, the system 100 is embodied in a stationary piece of equipment, such as a power generator or genset.

The engine 110 may be any type of engine that generates exhaust gas, such as a gasoline, natural gas, or diesel engine, a hybrid engine (e.g., a combination of an internal combustion engine and an electric motor), and/or any other suitable engine. In the example shown, the engine 110 is a diesel-powered compression-ignition engine.

The aftertreatment system 120 is coupled to and, particularly, in exhaust-gas receiving communication with the engine 110. The aftertreatment system includes a diesel particulate filter (DPF) 122, a diesel oxidation catalyst (DOC) 121, a selective catalytic reduction (SCR) system 123, an ammonia oxidation catalyst (AMOX) 124, and a heater 125. The DOC 122 is structured to receive the exhaust gas from the engine 110 and to oxidize hydrocarbons and carbon monoxide in the exhaust gas. The DPF 121 is arranged or positioned upstream of the DOC 122 and structured to remove particulates, such as soot, from exhaust gas flowing in the exhaust gas stream. The DPF 121 includes an inlet, where the exhaust gas is received, and an outlet, where the exhaust gas exits after having particulate matter substantially filtered from the exhaust gas and/or converting the particulate matter into carbon dioxide. In some implementations, the DPF 121 may be omitted.

The aftertreatment system 120 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR 123 generally (or in particular, the SCR catalyst 126) by a DEF doser such that the SCR catalyst 126 receives a mixture of the reductant and exhaust gas. However, in other embodiments, the DEF doser may inject reductant at any point in the aftertreatment system, including within the SCR catalyst 126 itself. The reductant droplets then undergo the processes of evaporation, thermolysis, and hydrolysis to form gaseous ammonia within the decomposition chamber, the SCR catalyst 126, and/or the exhaust gas conduit system, which leaves the aftertreatment system 120. The doser may have any construction and structure for injecting reductant into the exhaust aftertreatment system. The aftertreatment system 120 may further include an oxidation catalyst (e.g. the DOC 122) fluidly coupled to the exhaust gas conduit system to oxidize hydrocarbons and carbon monoxide in the exhaust gas. In order to properly assist in this reduction, the DOC 122 may be required to be at a certain operating temperature. In some embodiments, this certain operating temperature is approximately between 200-500° C. In other embodiments, the certain operating temperature is the temperature at which the conversion efficiency of the DOC 122 exceeds a predefined threshold (e.g. the conversion of HC to less harmful compounds, which is known as the HC conversion efficiency).

The SCR 123 includes the SCR catalyst 126 and is configured to assist in the reduction of NOx emissions by accelerating a NOx reduction process between the ammonia and the NOx of the exhaust gas into diatomic nitrogen, water, and/or carbon dioxide. If the SCR catalyst 126 is not at or above a certain temperature, the acceleration of the NOx reduction process is limited and the SCR 123 may not be operating at a level of efficiency to meet or likely meet regulations. In some embodiments, this certain temperature is approximately 200-300° C. The SCR catalyst 126 may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum). In some embodiments, the AMOX 124 is included with the aftertreatment system. The AMOX 124 is structured to address ammonia slip by removing or attempting to remove excess ammonia from the treated exhaust gas before the treated exhaust is released into the atmosphere.

Figure 5:
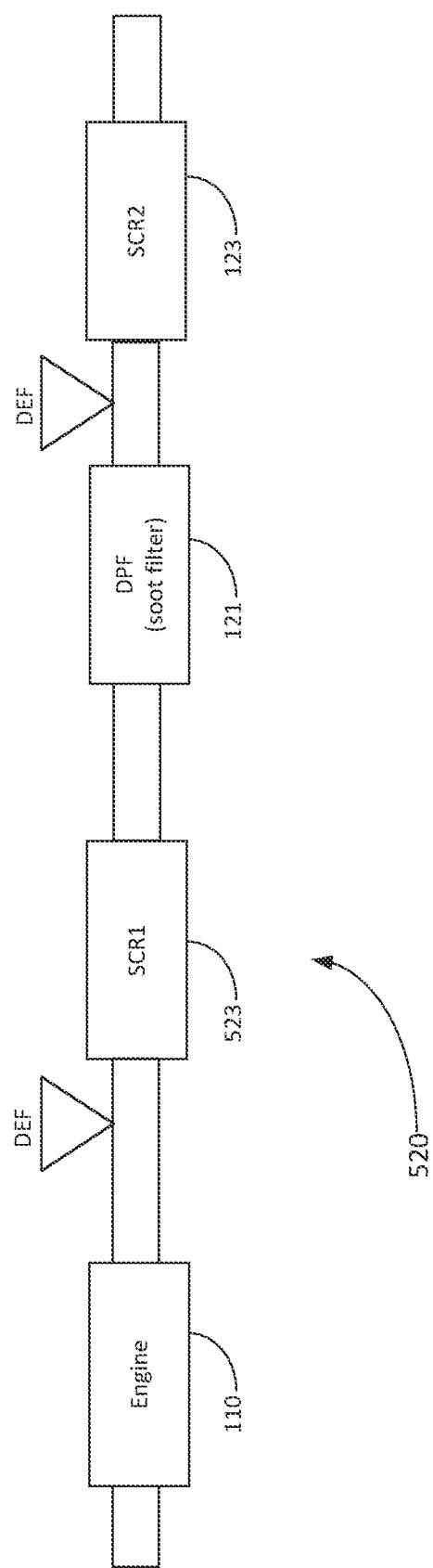
FIG. 5 is a schematic diagram of an alternative aftertreatment system of the system of FIG. 1, according to an exemplary embodiment.

In some embodiments, the aftertreatment system 120 is structured as a two-SCR system. Referring now to FIG. 5, an example two-catalyst (shown as a two-SRC catalyst) aftertreatment system 520 is shown, according to an example embodiment. The two-catalyst aftertreatment system 520 is substantially the same as the one-SCR aftertreatment system 120, but includes a first SCR system 523 (also referred to as a 'light-off SCR system) positioned relatively closer (i.e., upstream) to the engine 110 than the (second) SCR 123 and the DPF 121. The first SCR system 523 is relatively smaller in size (e.g., packaging/container and catalyst size) than the SCR 123 due to predominantly spatial constraints. The first SCR system 523 is fluidly coupled to its own dedicated DEF doser. The DEF doser can have a similar structure and function to the reductant doser described above. The SCR 123 is a relatively larger SCR system and is fluidly coupled to its own dedicated DEF doser like described above. Due to the proximity to the engine 110 and its size, the first SCR system 523 heats up relatively more quickly than the SCR 123. In turn, the first SCR system 523 may convert NOx quickly due to its smaller size, but packaging constraints make the first SCR system 523 too small to be the only SCR system on the engine because the smaller catalyst is insufficient for converting desired amounts of NOx associated with standard engine 110 operation. The SCR system 123 is analogous to an SCR system in a one-SCR architecture, meaning that the larger SCR system takes more time to heat to an operating temperature but is then capable of converting the amounts of NOx associated with standard engine 110 operation.

In some embodiments, the heater 125 is located in the exhaust flow path before the aftertreatment system 120 and is structured to controllably heat the exhaust gas upstream of the aftertreatment system 120. In some embodiments, the heater 125 is located directly before the DOC 122, while in other embodiments, the heater 125 is located directly before the SCR 123 or is directly incorporated into the SCR catalyst. The heater 125 may be any sort of external heat source that can be structured to increase the temperature of passing exhaust gas, which, in turn, increases the temperature of components in the aftertreatment system 120, such as the DOC 122 or the SCR 123. As such, the heater may be an electric heater, an induction heater, a microwave, or a fuel-burning (e.g., HC fuel) heater. As shown here, the heater 125 is an electric heater that draws power from a battery of the system 100 (or, another electric source, such as an alternator, super-capacitor, etc.). The heater 125 may be controlled by the controller 140 (e.g., turn on, turn off, turn to various degrees of power to change the heater output power, etc.). The heater may be positioned proximate a desired component to heat the component (e.g., DPF) by conduction (and possibly convection). Multiple heaters may be used with the exhaust aftertreatment system, and each may be structured the same or differently (e.g., conduction, convection, etc.).

Referring still to FIG. 1, an operator input/output (I/O) device 130 is also shown with the system 100. The operator I/O device 130 may be communicably coupled to the controller 140, such that information may be exchanged between the controller 140 and the I/O device 130, wherein the information may relate to one or more components of FIG. 1 or determinations (described below) of the controller 140. The operator I/O device 130 enables an operator of the system 100 to communicate with the controller 140 and one or more components of the system 100 of FIG. 1. For example, the operator input/output device 130 may include, but is not limited to, an interactive display, a touchscreen device, one or more buttons and switches, voice command receivers, etc.

The system 100 includes a plurality of sensors. The sensors are coupled to the controller 140, such that the controller 140 can monitor and acquire data indicative of operation of the system 100. In this regard, the sensors include NOx sensors 128 and temperature sensors 127. The NOx sensors 128 are structured to acquire data indicative of a NOx amount at or approximately at their disposed location. The temperature sensors 127 acquire data indicative of an approximate temperature of the exhaust gas at or approximately at their disposed location. In one embodiment, a first temperature sensor 127 is located upstream of the SCR catalyst 126 portion being modeled and a second temperature sensor 127 is located downstream of the SCR catalyst 126 potion being modeled. In some of these embodiments, the first and second temperature sensors 127 are located outside of the SCR catalyst 126, such that the first temperature sensor 127 is located upstream of the entire SCR catalyst 126 and the second temperature sensor 127 is located downstream of the entire SCR catalyst 126. In other of these embodiments, at least one of the first and second temperature sensors 127 are located within the SCR catalyst 126, such that the first temperature sensor 127 may be upstream of the particular portion of the SCR catalyst 126 that is being modeled rather than upstream of the entire SCR catalyst 126 and/or that the second temperature sensor 127 may be downstream of the particular portion of the SCR catalyst 126 that is being modeled rather than downstream of the entire SCR catalyst 126. Further, the system 100 includes at least one sensor for a gas species (i.e., NOx or ammonia) located downstream of at least one portion of the SCR catalyst 126, and one or more sensors may be included upstream of the SCR catalyst 126 in order to monitor conditions at the catalyst inlet (e.g., an amount of NOx, a temperature of the exhaust entering the SCR catalyst 126, a mass flow rate of exhaust at the SCR catalyst 126 inlet, etc.). However, it should be understood that the depicted locations, numbers, and type of sensors is illustrative only. In some embodiments, one or more of the sensors may be virtual sensors, such that the one or more sensors estimate output variables (e.g., data indicative of a NOx amount, data indicative of an approximate temperature, etc.) based on other operating parameters within the system. In other embodiments, the sensors may be positioned in other locations, there may be more or less sensors than shown, and/or different/additional sensors may also be included with the system 100 (e.g., a pressure sensor, an ammonia sensor, a flow rate sensor, etc.).

The controller 140 is structured to control, at least partly, the operation of the system 100 and associated sub-systems, such as the engine 110, aftertreatment system 120, and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

As the components of FIG. 1 are shown to be embodied in a vehicle, the controller 140 may be structured as one or more electronic control units (ECU). The function and structure of the controller 140 is described in greater detail in FIG. 2. The controller 140 may be separate from or included with at least one of a transmission control unit, an exhaust aftertreatment control unit, a powertrain control module, an engine control module, etc. In one embodiment, the components of the controller 140 are combined into a single unit. In another embodiment, one or more of the components may be geographically dispersed throughout the system. All such variations are intended to fall within the scope of the disclosure.

Figure 2:
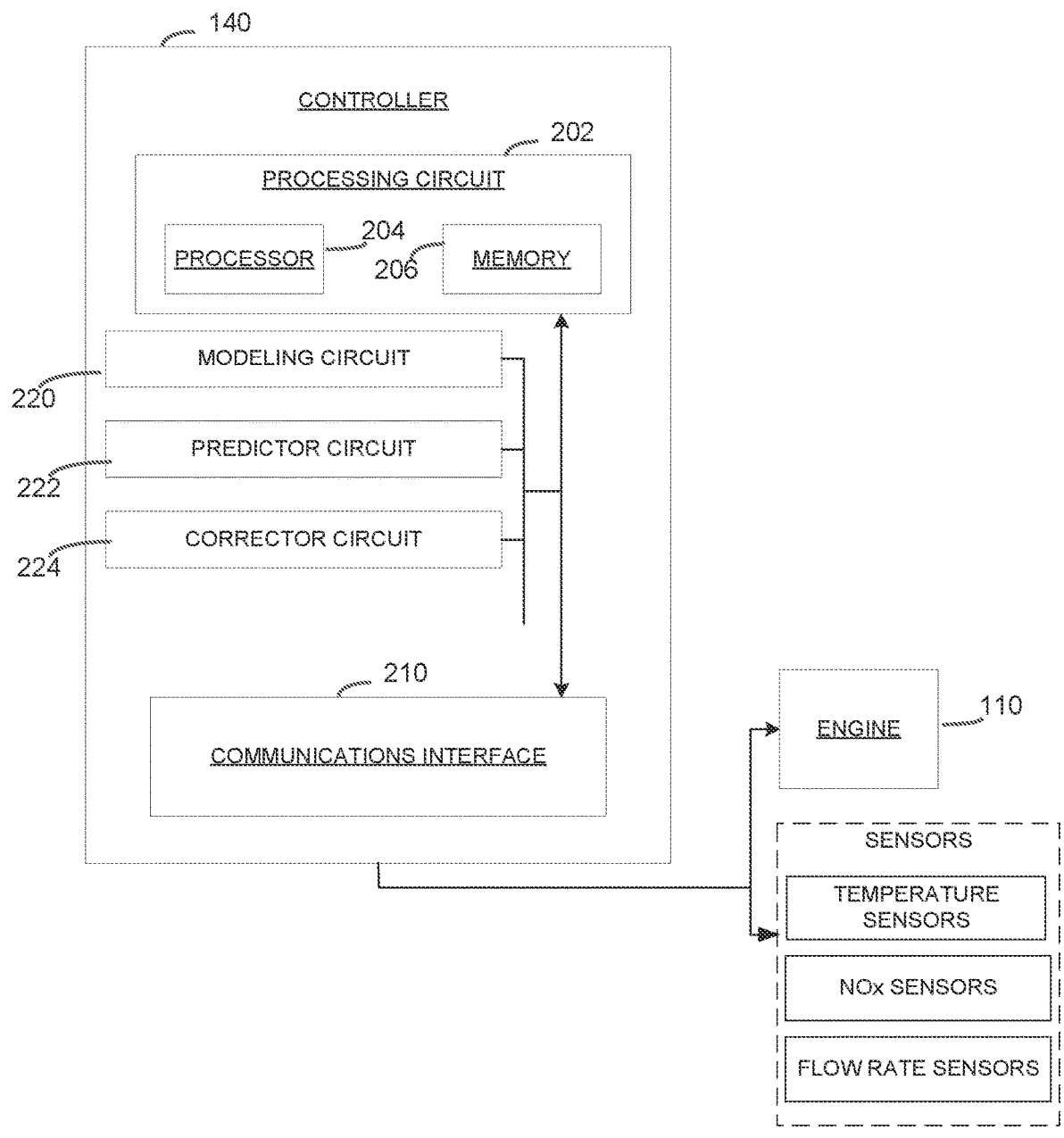
FIG. 2 is a schematic diagram of the controller of the system of FIG. 1, according to an exemplary embodiment.

Referring now to FIG. 2, a schematic diagram of the controller 140 of the system 100 of FIG. 1 is shown according to an example embodiment. As shown in FIG. 2, the controller 140 includes a processing circuit 202 having a processor 204 and a memory 206, a modeling circuit 220, a predictor circuit 222, a corrector circuit 224, and a communications interface 210. The controller 140 is configured or structured to control various components of the system 100 based on an integrated catalyst model in order to improve upon traditional methods of managing the aftertreatment system 120 to maintain acceptable emissions reducing ammonia slip.

In one configuration, the modeling circuit 220, the predictor circuit 222, and the corrector circuit 224 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the modeling circuit 220, the predictor circuit 222, and the corrector circuit 224 are embodied as hardware units, such as electronic control units. As such, the modeling circuit 220, the predictor circuit 222, and the corrector circuit 224 may be embodied as one or more circuitry components including, but not limited to, processing circuitry, network interfaces, peripheral devices, input devices, output devices, sensors, etc. In some embodiments, the modeling circuit 220, the predictor circuit 222, and the corrector circuit 224 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the modeling circuit 220, the predictor circuit 222, and the corrector circuit 224 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The modeling circuit 220, the predictor circuit 222, and the corrector circuit 224 may also include programmable hardware devices such as field programmable gate arrays, programmable array logic, programmable logic devices or the like. The modeling circuit 220, the predictor circuit 222, and the corrector circuit 224 may include one or more memory devices for storing instructions that are executable by the processor(s) of the modeling circuit 220, the predictor circuit 222, and the corrector circuit 224. The one or more memory devices and processor(s) may have the same definition as provided below with respect to the memory 206 and processor 204. In some hardware unit configurations, the modeling circuit 220, the predictor circuit 222, and the corrector circuit 224 may be geographically dispersed throughout separate locations in the vehicle. Alternatively and as shown, the modeling circuit 220, the predictor circuit 222, and the corrector circuit 224 may be embodied in or within a single unit/housing, which is shown as the controller 140.

In the example shown, the controller 140 includes the processing circuit 202 having the processor 204 and the memory 206. The processing circuit 202 may be structured or configured to execute or implement the instructions, commands, and/or control processes described herein with respect to the modeling circuit 220, the predictor circuit 222, and the corrector circuit 224. The depicted configuration represents the modeling circuit 220, the predictor circuit 222, and the corrector circuit 224 as machine or computer-readable media storing instructions. However, as mentioned above, this illustration is not meant to be limiting as the present disclosure contemplates other embodiments where the modeling circuit 220, the predictor circuit 222, and the corrector circuit 224, or at least one circuit of the modeling circuit 220, the predictor circuit 222, and the corrector circuit 224, is configured as a hardware unit. All such combinations and variations are intended to fall within the scope of the present disclosure.

The processor 204 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the modeling circuit 220, the predictor circuit 222, and the corrector circuit 224 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 206 may be communicably connected to the processor 204 to provide computer code or instructions to the processor 204 for executing at least some of the processes described herein. Moreover, the memory 206 may be or include tangible, non-transient volatile memory or non-volatile memory. Accordingly, the memory 206 may include database components, object code components, script components, or any other type of information structure for supporting the various activities and information structures described herein.

The communications interface 210 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and, in some embodiments, out-of-vehicle communications (e.g., with a remote server via a telematics unit). For example and regarding out-of-vehicle/system communications, the communications interface 210 may include an Ethernet card and port for sending and receiving data via an Ethernet-based communications network and/or a Wi-Fi transceiver for communicating via a wireless communications network. The communications interface 210 may be structured to communicate via local area networks or wide area networks (e.g., the Internet) and may use a variety of communications protocols (e.g., IP, LON, Bluetooth, ZigBee, radio, cellular, near field communication).

The modeling circuit 220 is configured to generate a spatially resolved and, in particular, a discretized axial model of a catalyst of the aftertreatment system 120. The modeling circuit 220 is structured to utilize the generated spatially vectorized model of the catalyst to estimate or determine a state of the catalyst. An axially resolved model of the catalyst refers to a model that estimates or determines a state of the catalyst at different portions of the catalyst by dividing or segregating the catalyst into a plurality of portions or zones. In some embodiments, the catalyst being modeled is the SCR catalyst 126. In other embodiments, the catalyst being modeled is a combination of the SCR catalyst 126 and AMOX 124. In the model described herein, the modeling circuit 220 discretizes the catalyst model axially along an axis parallel or substantially parallel with the exhaust flow through the catalyst 126. As described herein, for the model, the "state" or "state of the catalyst" refers to an amount of ammonia storage or a temperature value of the catalyst, respectively (i.e., an ammonia storage state or a temperature state for the catalyst).

Figure 3:
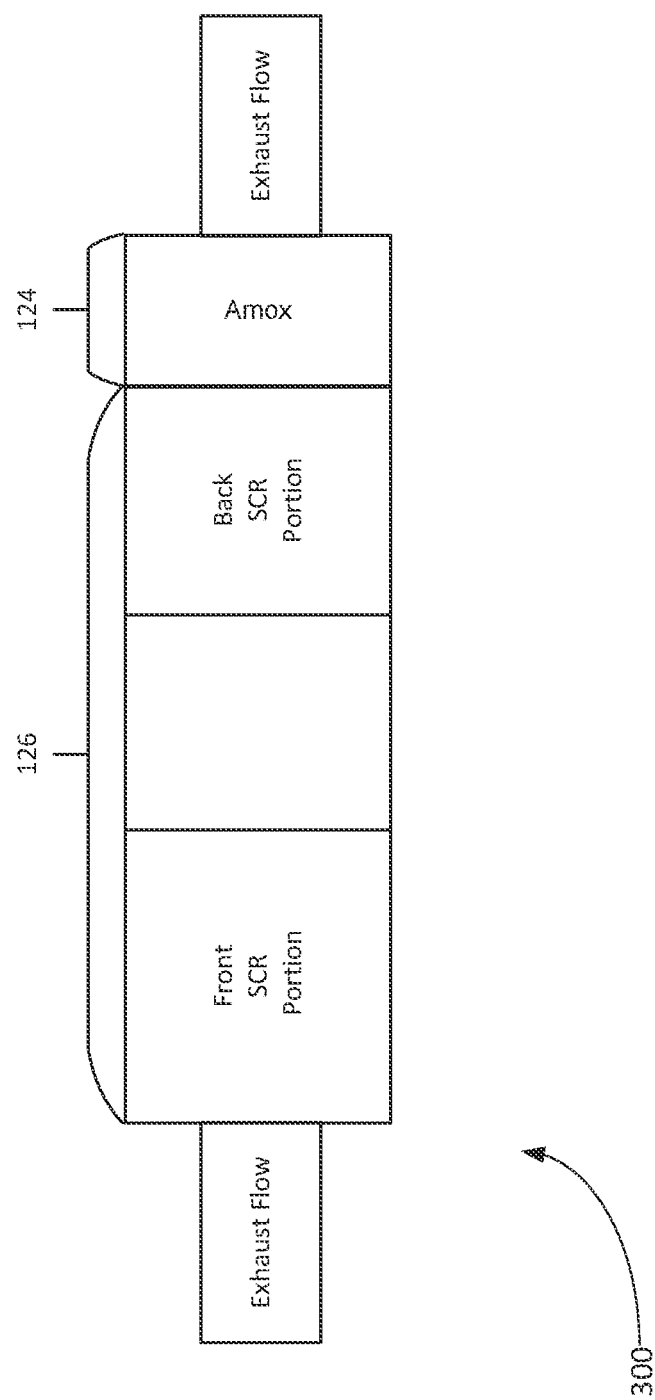
FIG. 3 is a graphical depiction of a discretized axial cross-section of a SCR catalyst and AMOx catalyst generated by the controller of FIGS. 1-2, according to an exemplary embodiment.

Referring now to FIG. 3, a visualization of an axially resolved model (or profile) of the SCR catalyst 126 and AMOX 124 by the modeling circuit 220 is shown, according to an exemplary embodiment. In this example, the axially resolved model of the SCR catalyst 126 shows that the SCR catalyst 126 has been divided into three portions: a front, middle, and rear (where rear is downstream relative to the exhaust gas flow direction). In this example where the catalyst includes the AMOX 124, the AMOX 124 represents its own zone or portion. So this example includes four portions. The number of portions may differ in other embodiments (e.g., other numbers greater than zero, etc.). Further, increasing the number of portions may correlate to overall model accuracy. However, increasing the number of portions may increase the processing power demand on the controller 140. Further, many of the control strategies that utilize the portions from the model are unable to target the catalyst with precision beyond more than 3-4 portions, so while overall model accuracy is improved by increasing the number of portions, there are factors that may weigh against increasing the number of portions beyond a certain amount.

The modeling circuit 220 is structured to receive characteristics relating to operation of the aftertreatment system 120 (e.g., SCR catalyst 126). These characteristics include physical dimensions of the aftertreatment system 120 (or components thereof such as a decomposition reactor tube), physical dimensions of the SCR 123, thermal mass of the SCR catalyst 126, mass of the SCR catalyst 126, and other characteristics of the aftertreatment system 120 that may affect performance. Generally speaking, these characteristics are set or fixed such that the characteristics may not change over the life-cycle of the model.

The modeling circuit 220 is also configured to build and adjust the states of the model (i.e., an amount of ammonia storage on the catalyst, a temperature value of the catalyst) based on sensed values from the sensors. As described above and with respect to temperature, the temperature sensors 127 may provide data indicative of a temperature of exhaust gas or a component where they are positioned. For example, the temperature sensors 127 may provide sensed values of a temperature of the exhaust gas upstream and downstream of a particular portion of the SCR catalyst 126, and the modeling circuit 220 uses these sensed values to inform the model. In one embodiment and based on the sensed values, the modeling circuit 220 assigns modeled values for the temperature to each of the portions based on a distance from the upstream and downstream sensors such that the middle-most portion (i.e., the portion equidistant from the upstream sensor and the downstream sensor) is assigned an average of the sensed value from the upstream sensor and the sensed value from the downstream sensor. In this regard, the portions may be assigned a modeled value based on a gradient between the sensed value from the upstream sensor and the sensed value from the downstream sensor. In one embodiment, this gradient is linear, such that the assigned modeled value has a linear relationship to the catalyst portion's distance from the sensors. In other embodiments, this gradient is a nonlinear relationship (e.g., exponential), such that the assigned modeled value is assigned a weighted value that gives more weight to proximity to either the upstream sensor or the downstream sensor (e.g., the middle-most portion is assigned a value closer to the sensed value from the upstream sensor).

In those embodiments in which there are sensor(s) embedded within the catalyst (in addition to the sensors upstream and downstream), the modeling circuit 220 may also assign modeled values to portions based on proximity to the embedded sensor. These values are in turn close to actual values. In this regard, any portions directly adjacent to the embedded sensor may be assigned the sensed value from the embedded sensor as the modeled value, and portions proximate but not directly adjacent are assigned modeled values based on sensed values from the embedded sensor and on sensed values from the upstream and/or downstream sensors. As such, the modeling circuit 220 is able to assign modeled values to portions of the catalyst utilizing any number of sensors.

The modeling circuit 220 may also receive sensed values from one or more NOx sensors 128. These sensed values indicate an amount of NOx in the exhaust gas at various points throughout the aftertreatment system 120 and can be used by the modeling circuit 220 to inform the model, similarly to how the model is informed for catalyst temperature. The modeling circuit 220 receives sensed values from a NOx sensor 128 upstream of the catalyst and a NOx sensor 128 downstream of the catalyst. The modeling circuit 220 then assigns modeled values for an amount of NOx at each of the portions based on a distance from the upstream and downstream sensors, such that the middle-most portion (i.e., the portion equidistant from the upstream sensor and the downstream sensor) is assigned an average of the sensed value from the upstream sensor and the sensed value from the downstream sensor. In this regard, the portions may be assigned a modeled value based on a gradient between the sensed value from the upstream sensor and the sensed value from the downstream sensor. In one embodiment, this gradient is directly linear, such that the assigned modeled value has a linear relationship to the portion's distance from the sensors. In another embodiment, this gradient has a nonlinear relationship (e.g., exponential), such that the assigned modeled value is assigned a weighted value that gives more weight to proximity to either the upstream sensor or the downstream sensor (e.g., the middle-most sensor is assigned a value closer to the sensed value from the upstream sensor). The modeling circuit 220, by using the modeled value of NOx for each portion of the catalyst, can model, estimate, or otherwise determine an amount of ammonia storage for each portion of the catalyst. For the SCR catalyst 126 in particular, the NOx in the exhaust gas reacts with the stored ammonia on the SCR catalyst 126, such that by modeling the amount of NOx at each portion, the modeling circuit 220 may determine an approximate amount of ammonia storage at each portion based on how much NOx is reduced from portion to portion. This determination may also include other factors, such as engine out NOx, a dosing amount, etc.

Thus, in other words, the modeling circuit 220 utilizes the sensed values from the sensors disposed in the aftertreatment system to generate "modeled values" for each portion of the catalyst (i.e., estimated values based on the sensed values). When the sensors are not disposed directly in the portion, the modeling circuit 220 extrapolates the sensed values to determine or estimate a corresponding value in various portions of the catalyst (hence, "modeled values"). The modeled values may be determined in a variety of ways as described above based on the placement of the sensors (e.g., the portions within a predefined distance of the sensor may be assigned the sensor readings, the portions in-between two sensors may be assigned an average of the two sensor readings, a gradient may be applied, and so on).

In some embodiments, the modeling circuit 220 defines the portions of the model of the catalyst of equal size (i.e., length) based on the size of the catalyst. In other embodiments, the modeling circuit 220 defines the portions of the model of the catalyst of unequal size (i.e., length), such as by defining shorter portions at the front of the catalyst in order to increase model resolution (i.e., model accuracy) towards the front of the catalyst and to decrease model resolution towards the rear of the catalyst. In these embodiments, by increasing model resolution in the front portions, the modeling circuit 220 is balancing the computational burden on the controller 140 in a desired manner. In other embodiments, the modeling circuit 220 defines the portions of the model of the catalyst based on a location of sensors (either temperature sensors 127 or NOx sensors 128) throughout the catalyst. In this situation, the temperature sensor positions (or NOx or other sensor positions) indicate break points for the portions of the catalyst model.

While references with the modeling circuit 220 have primarily been made to an aftertreatment system 120 with a one-SCR architecture, the modeling circuit 220 is configured to develop model(s) for those embodiments in which the aftertreatment system 120 has a two-SCR architecture. In those embodiments, the modeling circuit 220 is structured or configured to develop models for each of the smaller SCR system (described above) and the larger SCR system based on the principles and methods described previously. In some of those embodiments, the models for each the smaller SCR system and the larger SCR system are utilized by the other circuits (e.g., the predictor circuit 222, the corrector circuit 224) independently of each other, such that the controller 140 issues commands that affect the smaller SCR system without regard to the model of the larger SCR system, and vice versa. In other of these embodiments, the models for each the smaller SCR system and the larger SCR system are utilized by the other circuits in combination, such that the controller 140 issues commands based on inputs from the models for both the smaller SCR system and the larger SCR system.

The predictor circuit 222 is structured to compare the determined modeled values for each portion of the catalyst to a predetermined value, and to command components of the system 100 in response to the comparison. The determined modeled values of the SCR catalyst 126 may be a temperature of the SCR catalyst 126 (or of a portion thereof) or an amount of ammonia stored on the SCR catalyst 126 (or on a portion thereof). The modeled catalyst (or component) may be the SCR catalyst 126, the AMOX 124, the DOC 122, and/or the DPF 121. In this regard, determined modeled values of the SCR catalyst 126 may be the determined modeled value of a particular portion of the SCR catalyst 126 or the determined modeled values of multiple portions of the SCR catalyst 126, either in aggregate or averaged.

The predictor circuit 222 compares that determined modeled value to a predetermined value. In some embodiments, this predetermined value is a target value for the state (e.g., ammonia storage, temperature), a threshold for the state (e.g., ammonia storage, temperature), or a combination of the two. The threshold for the state refers to a value for the state that the determined modeled value is to stay above (if the threshold is a minimum) or under (if the threshold is a maximum), whereas the target value refers to a specific value for the state that the determined modeled value is attempting to achieve. As discussed later with reference to the corrector circuit 224, the predetermined value may be dynamic and adjusted throughout operation of the system 100, such that the predetermined value more closely represents present performance. Thus, in addition to the methods described below for updating the predetermined value, the predetermined value may be also adjusted based on an expected engine 110 load, ambient conditions (e.g., temperature, humidity, etc.), or sensor readings. If the predetermined value is a target value, the target value may be set based on a desired operation of the SCR 123. For example, if the state at-issue is temperature, the target value may be a temperature value at which a NOx conversion efficiency of the SCR 123 is at or above a certain value (e.g., 95%), or may be a desired temperature value for the system. Alternatively, if the state at-issue is ammonia storage, the target value may be set as an amount of stored ammonia that is sufficient for a NOx conversion efficiency at or above a certain value (e.g., 95%).

Similarly, if the predetermined value is a threshold, the threshold may be set based on a desired operation of the SCR 123. For example, if the state at-issue is temperature, the threshold may be set as a temperature value below which the SCR 123 fails to reach a desired NOx conversion efficiency (e.g., 95%). Alternatively, if the state at-issue is ammonia storage, the threshold may be an ammonia slip threshold.

In those embodiments in which the predictor circuit 222 utilizes a combination of target value(s) and threshold(s), the predictor circuit 222 utilize target values and thresholds from one or more states. For example, the predictor circuit 222 may compare the SCR catalyst 126 status to a target value for temperature and a threshold for ammonia storage, to a target value for ammonia storage and a threshold for temperature.

The predictor circuit 222 is configured to take an action or issue a command in response to the comparison of the SCR catalyst 126 determined modeled value to the predetermined value. This command may be one or more of altering an amount of DEF from the doser (i.e., either increasing the amount of reductant being dosed or decreasing the amount of reductant being dosed), altering an engine-out NOx (EONOx) amount by reducing a power output (e.g., increasing an EGR amount), and activating the heater 125. Altering an EONOx amount (i.e., the amount of NOx in the exhaust gas as it enters the aftertreatment system 120) may include altering an air/fuel ratio (where increasing the ratio by increasing the proportion of air in the intake reduces an amount of EONOx, and vice versa), adjusting an amount of fueling (where increasing the amount of fueling increases an amount of EONOx, and vice versa), and/or altering a timing of fuel injection (where retarding the timing reduces EONOx). The command can also include adjusting engine operation, such as altering a load on the engine 110 (where an increased load leads to higher engine-out exhaust temperatures, and vice versa), altering an amount of exhaust gas redirected (e.g., via an EGR system) back to the engine (where increased EGR decreases combustion temperature in the engine 110, thereby decreasing engine-out exhaust temperatures, and vice versa), and so on.

In an illustrative example in which the monitored state is temperature, if the comparison of the temperature of a portion of the SCR catalyst 126 to a target temperature value indicates that the portion of the SCR catalyst is too cold (i.e., the temperature is below a temperature threshold), the predictor circuit 222 commands one or more components of the system 100 to increase the temperature of the affected portion(s) of the SCR catalyst 126. The predictor circuit 222 determines the component to command and the command to issue based on a relative location of the portion along the SCR catalyst. For example, if the portion of the SCR catalyst 126 that is too cold is towards the front of the SCR catalyst 126 (i.e., near the exhaust-receiving inlet), the predictor circuit 222 may prioritize commands that more effectively affect the front of the SCR catalyst 126, such as increasing the engine-out exhaust temperatures via affecting EGR amounts. In another example, if the affected portion of the SCR catalyst is towards the middle or rear of the SCR catalyst 126 (i.e., away from the exhaust-receiving inlet), the predictor circuit 222 may prioritize a command that more effectively affects the middle or rear of the SCR catalyst 126, such as the heater 125, or may prioritize commands that more effectively affect the front of the SCR catalyst 126 while increasing the effects in order to affect the middle and rear of the SCR catalyst 126 (e.g., increasing the engine-out exhaust temperatures to a relatively greater degree).

Alternatively in this same example, the predictor circuit 222 may, in response to determining that a portion of the SCR catalyst 126 is too cold, issue commands in order to reduce the amount of EONOx, thereby maintaining lower SONOx despite the SCR 123 reducing NOx at a potentially less-than-desired efficiency. In this situation, the predictor circuit 222 may alter the strength (i.e., the quantity of change requested) of the issued commands based on a location of the affected portion of the SCR catalyst 126. For example, if the affected portion of the SCR catalyst 126 that is too cold is in the front of the SCR catalyst 126 (i.e., near to the exhaust-receiving inlet), the predictor circuit 222 may issue commands to more drastically reduce EONOx than if the affected portion of the SCR catalyst is to the rear of the SCR catalyst 126 (i.e., away from the exhaust-receiving inlet) because the front portions of the SCR catalyst 126 perform a majority of the NOx reduction. In this case, a less efficient front portion has more of a negative impact on overall SCR 123 reduction efficiency.

In another illustrative example in which the monitored state is ammonia storage, if the comparison of the amount of stored ammonia of a portion of the SCR catalyst 126 to an ammonia storage threshold indicates that the portion of the SCR catalyst has too little ammonia (i.e., the stored amount is below a desired threshold amount), the predictor circuit 222 commands one or more components of the system 100 to increase the amount of ammonia stored on the affected portion of the SCR catalyst 126. These commands could be, for example, increasing an amount of DEF dosed or by decreasing the amount of EONOx, which would indirectly increase the amount of ammonia (assuming the DEF dosing amount is unchanged) by reducing the amount of ammonia that is reacted away. The predictor circuit 222 may alter or prioritize commands based on a relative location of the portion along the SCR catalyst 126. For example, if the portion of the SCR catalyst 126 that has too little stored ammonia is towards the front of the SCR catalyst 126 (i.e., near to the exhaust-receiving inlet), the predictor circuit 222 may prioritize those commands that directly add ammonia to the SCR catalyst 126 (e.g., increased DEF dosing) because the affected portion is one of the first portions to receive exhaust, meaning that the affected portion is the first to receive any other contents included with the exhaust gas (such as ammonia from the DEF). Alternatively, if the affected portion is towards the middle or rear of the SCR catalyst 126 (i.e., away from the exhaust-receiving inlet), the predictor circuit 222 may prioritize those commands that indirectly affect the amount of stored ammonia (e.g., decreased EONOx) as these commands are more likely to have the intended effect on a portion of the SCR catalyst 126 farther from the exhaust-receiving inlet as these commands are less tied to content (such as ammonia from the DEF) being carried in the exhaust stream. Further, if the affected portion is towards the middle or rear of the SCR catalyst 126, the predictor circuit may decide to utilize the direct addition of ammonia but at a higher volume than for a front-oriented affected portion in order to account for the ammonia-carrying exhaust to pass through other portions of the SCR catalyst 126 before reaching the affected portion.

In another illustrative example in which the monitored states are a combination of temperature and ammonia storage, the predictor circuit 222 may prioritize commands that affect both states in order to more efficiently manage SCR 123 performance and ammonia slip. For example, if the predictor circuit determines, based on the comparison of the status of a portion of the SCR catalyst 126 to predetermined values for both temperature and ammonia storage, that the portion of the SCR catalyst 126 is too cold and has too much stored ammonia, the predictor circuit 222 may issue commands that increase temperature and decrease ammonia storage. In this example, the predictor circuit 222 may command increased fueling for the engine 110, which not only increases the combustion temperature (thereby increasing the engine-out exhaust temperature) but also increases the amount of EONOx. The higher engine-out exhaust temperature raises the temperature of the affected portion of the SCR catalyst 126 while the increased amount of EONOx reacts with the stored ammonia, reducing the overall amount of ammonia stored on the affected portion.

The predictor circuit 222 may also monitor and issue commands that affect multiple catalyst portions concurrently. For example, the predictor circuit 222 may determine, based on a comparison of a status of a first portion of the SCR catalyst 126 to a predetermined value and of a status of a second portion of the SCR catalyst 126 to a predetermined value, that the first portion is too cold (e.g., the temperature is under a threshold value) and that the second portion has too little stored ammonia (below a threshold value). In this example, the predictor circuit 222 may prioritize heating commands that may not or attempt to not increase EONOx (such as engaging the heater 125) in order to warm the first portion while not overwhelming the limited reductive capabilities of the second portion. Similarly, the predictor circuit 222 may prioritize ammonia-increasing commands that do not or attempt to not reduce exhaust temperature (such as increasing DEF dosing levels) in order to increase the amount of stored ammonia on the second portion without hampering the ability of the first portion to warm.

In some embodiments, the predictor circuit 222 establishes different pre-determined values for each portion of the SCR catalyst 126 (which may be the same or different for each portion). For example and regarding ammonia storage, a target value for a front portion of the SCR catalyst 126 may be relatively high in order to account for the heightened amount of NOx reduction that occurs at the front portions of the SCR catalyst. However, a target value for a rear portion of the SCR catalyst 126 may be relatively low (or even zero) to act as a buffer for any excess ammonia that remains in the exhaust stream through the majority of the SCR catalyst 126, thereby absorbing some of that unreacted ammonia into storage rather than allowing ammonia slip.

The predictor circuit 222 may also issue commands based on the modeled values of one or more portions of multiple catalysts compared to one or more predetermined values (e.g., desired values, thresholds, target values). For example, as mentioned above, the aftertreatment system may be structured as the two-catalyst aftertreatment system 520 that includes the first SCR system 523 positioned proximate the engine 110 and has the SCR 123 positioned downstream from this smaller SCR system, with the DPF 121 positioned between the two SCR systems. One or more sensors may be positioned proximate the first SCR system 523 to obtain modeled values of the portions of the first SCR catalyst 523 analogous to described above for the catalyst (e.g., SCR 123 catalyst) (e.g., ammonia storage amount). The downstream SCR 123 catalyst may be divided into portions and modeled values determined for those portions. Based on the determined modeled values for the portions of the upstream and downstream catalysts (in this case, SCR catalysts), the predictor circuit 222 may issue various commands. For example, the predictor circuit 222 may control dosing of reductant for the upstream catalyst different from that of the downstream catalyst based on the ammonia loading experienced in the upstream catalyst relative to that of the downstream catalyst as determined by the modeled values. As an example, the modeled values of the front portions of the upstream catalyst may indicate low ammonia storage (i.e., below a threshold) while the modeled values the front portions of the downstream catalyst indicate high ammonia storage (i.e., above a threshold). As a result, the controller commands increased dosing for the upstream catalyst and decreased dosing for the downstream catalyst in order to build up ammonia storage in the front portions of the upstream catalyst. Additionally, similar commands may be provided for the upstream catalyst as described above (e.g., based on temperature). In some embodiments, this other catalyst (e.g., first SCR system 523) may have a dedicated controller for controlling the doser and potentially other components. Thus, in this embodiment, there may be one controller for each of the SCR catalyst systems. Each of these controllers may have the same or similar structure as described herein with respect to the controller 140. In this embodiment, the controllers "talk" to/communicate with each other to optimize the overall system performance. In other words, the upstream controller knows the storage of the downstream catalyst and the downstream controller knows the storage information of the upstream catalyst and commands tuned to optimize overall performance are provided.

With respect to the two-catalyst aftertreatment system 520, the predictor circuit 222 may issue commands to prioritize or otherwise utilize one SCR system over the other SCR system until a certain condition is obtained. In one embodiment, the certain condition is the catalyst (or, a desired portion or portions of the catalyst) reaching a desired operating temperature. In another embodiment, the certain condition is the ammonia storage amount on the catalyst (or, one or more portions thereof) relative to ammonia storage threshold. In yet another embodiment, the certain condition is a combination of temperature and ammonia or reductant storage. As described above, the size and location of the first SCR system 523 may allow the first SCR system 523 to reach an operating temperature relatively earlier than the downstream SCR 123. Generally, it is desired for high concentrations of NOx to go into the DPF 121 in order to passively regenerate the filter. In that way, the DPF 121 cleans itself rather than requiring the system 100 into a high heat mode in order to burn off accumulated soot. If the first SCR system 523 is used to convert a lot of the EONOx, there is not much NOx available to help clean the DPF 121. This results in more frequent high temperature regeneration events to keep the DPF 121 clean, which incurs a fuel penalty and increases the hydrothermal aging/degradation of the catalysts.

In one example, the predictor circuit 222 issues commands to utilize the first SCR system 523 until the downstream SCR 123 is at an operating temperature (e.g., during an initial warm-up period for the system 100), at which point the predictor circuit 222 issues a command to shut off DEF dosing for the first SCR system 523. However, if the SCR 123 does not have any (or, beyond a threshold amount) stored ammonia when the "switch" (i.e., dosing to first SCR system 523 is reduced or shut off) is made, there may be poor overall SONOx until sufficient ammonia storage is built up on the SCR 123. In order to address this concern, the predictor circuit 222 is configured to delay the dosing shut-off command (or dosing reduction command) for the first SCR system 523 until the downstream SCR 123 has sufficient ammonia storage (greater than a predefined threshold amount). For example, if the modeled value of temperature for the SCR 123 is above a pre-defined threshold for operation but the modeled value of ammonia storage for the SCR 123 is below a pre-defined threshold for operation, the predictor circuit 222 determines to delay the dosing shut-off command. The predictor circuit 222 may send the dosing shut-off command for the upstream first SCR system 523 when the modeled value of ammonia storage for the SCR 123 is above a predefined threshold for operation. The predictor circuit 222 may also, in this situation, command lower EONOx (e.g., during the initial warm-up period) due to the lower overall reduction capacity of the first SCR system 523.

Further, in this example embodiment, the predictor circuit 222 may determine to re-engage the first SCR system 523 based on the modeled values and/or sensed values for the system 100. For example, if the current conditions are particularly challenging due to steep temperature or EONOx transients (e.g., drastic increases due to frequent hard accelerations) or if the downstream catalyst (i.e., SCR 123) has degraded functionality due to hydrothermal aging or chemical poisoning, the predictor circuit 222 may re-engage the first SCR system 523 (e.g., issue a command to resume DEF dosing for the first SCR system 523) in order to balance the burden of NOx reduction across both the first SCR system 523 and the SCR 123. In this manner, the predictor circuit 222 allows the system to maintain desired overall system-out emissions (e.g., SONOx) in spite of degraded or malfunctioning components. In another example, if it is desired to run the engine at higher EONOx levels, the predictor circuit 222 can utilize both the first SCR system 523 and the SCR 123 to maintain desired SONOx. This may be the case if there is an engine component malfunction that causes the engine 110 to run in a "protection mode" that has higher EONOx, enabling the system 100 to maintain emissions performance until the vehicle is able to be serviced.

The corrector circuit 224 is configured to adjust the desired values of aftertreatment system 120 states based on feedback from the sensors and to compare the adjusted values to the desired values in order to identify faults in the system 100. These desired values may be the predetermined values (i.e., target values, thresholds) of the predictor circuit 222, although the corrector circuit 224 and the predictor circuit 222 may operate independently of each other. These desired values for the states may be established (i.e., the reference value for comparison is set) when the system 100 is first started in the system's life-cycle, when the system 100 is first started for a period of use, or any other time in the system's 100 life-cycle. In some embodiments, the desired values for the states are established by user command (i.e., via the I/O device 130). The states include temperature and ammonia storage.

As used for the corrector circuit 224, the desired value for a state refers to a value for the state at which the aftertreatment system 120 (and in particular embodiments, the SCR 123 and SCR catalyst 126) is performing as desired. For example, the desired value for temperature is a temperature value at which the SCR 123 has an acceptable or desirable NOx conversion efficiency (e.g., 95%). If the state is ammonia storage, the desired value is an amount of stored ammonia on the SCR catalyst 126 (or on a portion of the SCR catalyst 126) at which the SCR 123 has an acceptable or desirable conversion efficiency (e.g., 95%) and/or the amount of ammonia slip (i.e., ammonia that remains unreacted in the exhaust stream and is released into the atmosphere) is kept at an acceptable or desirable level (e.g., XX %).

The corrector circuit 224, after the desired value for the state is set, then adjusts the desired value based on feedback from the sensors. Because the desired value represents a value for a state at which the aftertreatment system 120 is operating as desired, the desired value may be adjusted as the components in the aftertreatment system 120 age or are worn in order to continue representing a value for a state at which the aftertreatment system 120 is operating as desired. For example, over time through use, the SCR catalyst 126 tends to wear out and lose some conversion efficiency, requiring a higher temperature (i.e., higher than 250° C.) in order to reach an acceptable NOx conversion efficiency. As such, if the desired value for temperature is not adjusted during the SCR catalyst 126 life-cycle, the desired value would no longer represent a value for the state at which the SCR catalyst 126 is reducing NOx as desired.

The corrector circuit 224 determines the adjustment to the desired value based on a comparison of an expected value for a sensed value and an actual value for the sensed value. For example, if the temperature of the SCR catalyst 126 (which may be given as a temperature of the SCR catalyst 126 generally, of a majority of portions of the SCR catalyst 126, or of an average of the portions of the SCR catalyst 126) is at the desired value (e.g., 250° C.), the corrector circuit 224 may expect the NOx conversion efficiency as sensed by a NOx sensor 128 to be at or close to a desired value (e.g., 95%). As such, if the actual sensed value from the NOx sensor 128 is different from that expected value (e.g., 85%), the corrector circuit 224 determines that the desired value is to be adjusted. In some embodiments, the corrector circuit 224 makes an adjustment only if the difference between the expected value and the actual value exceeds a threshold. This threshold may be an absolute quantity (e.g., 0.001 grams of difference) or a relative quantity (e.g., 10% different). The quantity of the adjustment is determined based on an algorithm incorporated into the corrector circuit 224.

Figure 6:
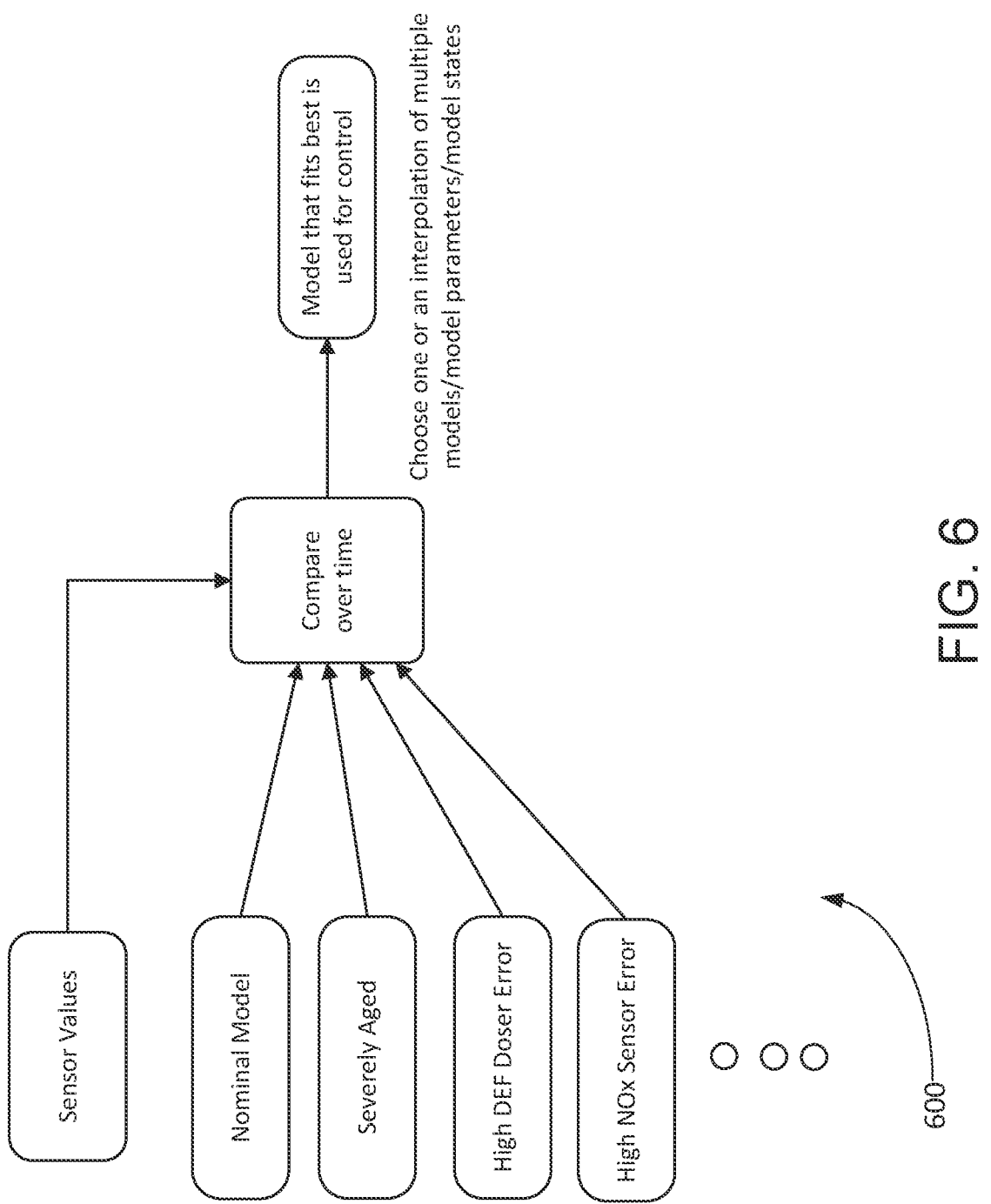
FIG. 6 is a flowchart of a process for adjusting a model of the system of FIG. 1, according to an exemplary embodiment.

Referring now to FIG. 6, an example flow chart is given for a process 600 for adjusting the model for one or more catalysts in the system 100. The process 600 may be stored by the corrector circuit 224 (or, in the memory 206 for execution by the corrector circuit 224) and selectively ran or executed by the corrector circuit 224. The process 600 may include one or more algorithms, models, look-up tables, and the like to facilitate execution and completion of the process 600. As an input, the process 600 takes the sensed values and compares the sensed values to a 'nominal' model (i.e., a model that nominally matches the system 100 as currently operating. The current nominal model may be selected from one or more models, As shown in FIG. 6, these models include, but are not limited to, a 'Nominal' model, which represents the previously selected nominal model, a 'Severely Aged' model, which represents a system operating with aged components, a 'High DEF Doser Error' model, which represents a system operating with malfunctioning DEF injectors, and a 'High NOx Sensor Error," which represents a system operating with sensors having bias or gain errors. The corrector circuit 224 may determine which model (or models) to select as the nominal model based on a determination of which model best matches (i.e., has the lowest error) when compared to the sensed values for the system 100. The determination of lowest error may be based on a calculation of error for a single modeled value (e.g., temperature) or on a summation of error for multiple modeled values (e.g., temperature and ammonia storage. If based on a summation of error for multiple modeled values, the determination may treat the error for each modeled value equally (i.e., 1:1) or may weigh the errors differently (e.g., weigh an error in the ammonia storage modeled value more heavily than temperature in order to identify a model that more accurately models ammonia storage in particular). Further, the corrector circuit 224 may utilize an Extended Kalman Filter or other similar controls technique in order to slowly adapt the model parameters and/or values over time based on the available sensors. In some embodiments, the corrector circuit 224 continues to monitor errors in modeled values after the nominal model is selected and corrections/adjustments are made, and may 'undo' any corrections made based on a previously selected nominal model if the errors in the modeled values continue to increase. This continual monitoring is especially important with current NOx sensors because current NOx sensors can be cross-sensitive to ammonia, so if the corrector circuit 224 made an adjustment based on an impression that a high sensed value from the NOx sensor indicated a high NOx amount (which would indicate too little ammonia in the system 100) when the high sensed value actually indicated a high ammonia amount (which would indicate too much ammonia in the system 100), the corrector circuit 224 is able to remedy this through continuous monitoring.

Once the corrector circuit 224 has selected a nominal model, the corrector circuit 224 may compare the modeled value for temperature or ammonia storage to a sensed value, and modify one or more parameters (e.g., reaction rates, thermal mass of the SCR 123, material properties of aftertreatment system 120 components, etc.) based on the comparison. Further, the corrector circuit 224 may modify one or more modeled values (e.g., ammonia storage levels, temperature) based on the comparison. The corrector circuit 224 determines which modeled values to adjust based on the values being compared in order to determine whether the error is more likely due to ammonia slip or NOx slip. For example, if the initial determination (from the comparison) by the algorithm is ammonia slip, the corrector circuit 224 would increase the modeled value for ammonia storage. Alternatively, if the initial determination is NOx slip (i.e., higher-than-acceptable levels of SONOx), the corrector circuit 224 would decrease the modeled value for ammonia storage. Functionally speaking, the quantity of the difference leads to a relatively equal adjustment (i.e., the larger the difference, the larger the adjustment).

Once the corrector circuit 224 determines an adjusted value, in some embodiments, the corrector circuit 224 uses this adjusted value in order to diagnose faulty components in the aftertreatment system 120. Because the adjusted value captures the current status of the aftertreatment system 120, by comparing the adjusted value to the desired value, which captures the status of the aftertreatment system 120 at a previous point in time, the difference between the current status and the previous status of the aftertreatment system 120 can be determined. Although the corrector circuit 224 may expect to see some amount of difference over time due to the expected aging of components, if the corrector circuit 224 determines a difference to be drastic (i.e., greater than a predefined error threshold), the corrector circuit 224 may determine that an error is present in the system 100 and raises a corresponding fault flag (e.g., activates a fault code, triggers a malfunction indicator lamp, etc.). In some embodiments in which the aftertreatment system 120 is the two-catalyst aftertreatment system 520, the corrector circuit 224 may, in response to the determination that an error is present, issue commands to utilize both the first SCR system 523 and the SCR 123 in order to address some of the issues that may accompany a system 100 error (e.g., higher EONOx due to a malfunctioning engine 110 component).

In some of these embodiments, the error threshold is a dynamic threshold, such that the corrector circuit 224 may adjust and change the error threshold in order to account for changes in operation, either through age, ambient environment, or some other expected event. For example, the corrector circuit 224 may increase the error threshold (i.e., require a larger difference to meet) as the components of the aftertreatment system 120 age in order to account for the expected changes in performance that accompany an aged SCR catalyst 126. The amount of increase for the error threshold may be based on a lookup table that provides values for an expected difference based on component age.

Alternatively, the corrector circuit 224 may maintain a substantially constant error threshold across the life-cycle of the system 100. The corrector circuit 224 may then monitor the rate of change for the difference between the adjusted and desired values rather than a total amount of change. In this embodiment, the desired value is set or established at the beginning of each duty cycle in order to provide a more relevant rate of change. Because, as discussed above, the adjusted value may change over the life-cycle of the system 100 due to expected aging, the corrector circuit 224 may expect some amount of change to the adjusted value on a near-constant basis. However, because this amount of change is expected, any amount of change that greatly exceeds this expected amount may indicate an error or a faulty component in the system 100.

Once the corrector circuit 224 determines that an error or faulty component is present, the corrector circuit 224 can determine the specific component or genus of component (i.e., aftertreatment system 120 component, engine 110 component, etc.) in coordination with the sensors. For example, if the ammonia storage state has exceeded the error threshold and the NOx sensor 128 indicates an unacceptably high SONOx value, the corrector circuit 224 may determine that the SCR catalyst 126 is degraded due to having unusually high levels of stored ammonia while still not reducing NOx to an acceptable level.

In some embodiments, the corrector circuit 224 works together with the predictor circuit 222 by providing the adjusted value to the predictor circuit 222, which the predictor circuit 222 then uses to update the predetermined values that establish either a target value or a threshold for SCR catalyst 126 status. As such, the predictor circuit 222 is able to more effectively issue commands to various system 100 components in order to manage aftertreatment system 120 performance because the predetermined values, which are used to make decisions about those commands, more closely align with current system 100 performance.

Figure 4:
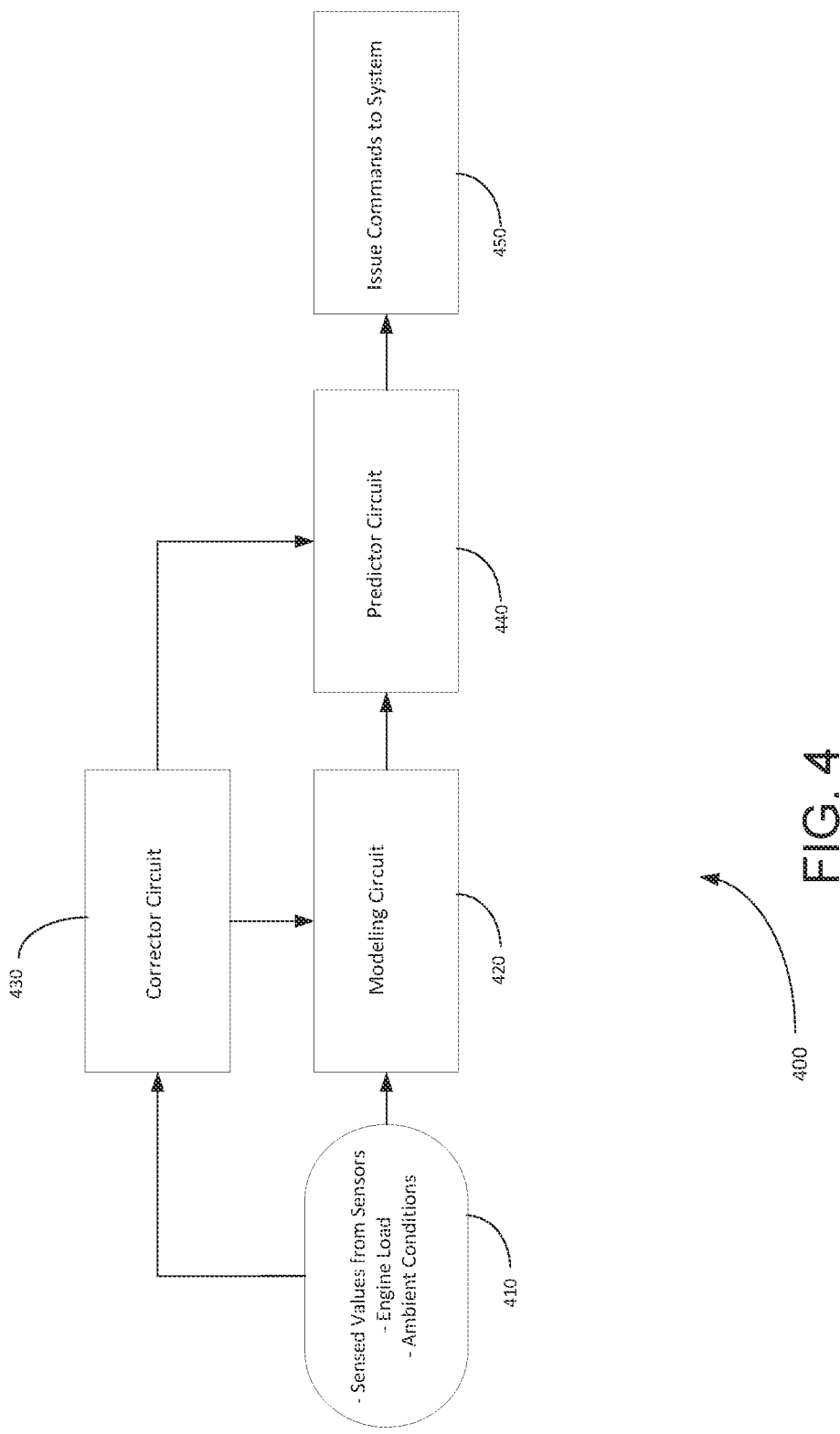
FIG. 4 is a flow chart of a method managing NOx and ammonia in an exhaust gas aftertreatment system, according to an exemplary embodiment.

Referring now to FIG. 4, a flow chart of a method managing NOx and ammonia in an exhaust gas aftertreatment system, according to an exemplary embodiment. The method 400 begins at step 410, where the controller 140 receives information regarding system 100 operation, which includes sensed values from the sensors (e.g., NOx, temperature, exhaust flow rate, etc.), a load on the engine 110, information regarding ambient conditions (e.g., temperature, humidity, etc.), and/or other information regarding operation of the system 100. The information from step 410 serves as input to steps 420 and 430. At step 420, the controller 140, via the modeling circuit 220, uses the input from step 410 to generate or inform an axially resolved model of a catalyst (in this example, the SCR catalyst 126). At step 430, the controller 140, via the corrector circuit 224, uses the input from step 410 to update the model to improve the overall efficacy of the method 400. The method then proceeds to step 440, where the controller 140, via the predictor circuit 222, proactively manages the aftertreatment system 120 (specifically the SCR catalyst 126) based on the modeling circuit 220 in order to maintain acceptable SONOx levels and reduce ammonia slip. Finally, the method 400 proceeds to step 450 where the controller 140 issues commands to components of the system 100 based on the determinations made by the predictor circuit 222 at step 440. In some embodiments, steps 440 and 450 may be combined in a single step.

In addition, while reference is made primarily to the modeling circuit 220 providing a model of the SCR catalyst 126 with monitored states directed generally to NOx reduction and ammonia storage, the modeling circuit 220 may be configured to generate a similar axially resolved model of the DOC 122 with monitored states directed generally to soot buildup on the DOC 122 and associated regeneration events. In these soot-related embodiments, the monitored state is an amount of soot buildup, such that the monitored state for the modeled DOC 122 is the soot buildup quantity on each portion. The modeling circuit 220 develops and updates the axially resolved model of the DOC 122 based on sensed values from the sensors related to exhaust flow rate and pressure across portions of the DOC 122 (as soot buildup restricts flow and increases pressure). Accordingly, the commands issued by the predictor circuit 222 in these soot-related embodiments are primarily directed to thermal management commands that remove soot (i.e., increasing the temperature of the exhaust gas passing through the aftertreatment system 120 in order to burn off the soot buildup). As discussed above with regard to the NOx-reduction and ammonia storage embodiments, the predictor circuit 222 may leverage the added utility from modeling multiple portions of the DOC 122 in order to more effectively regenerate those portions of the DOC 122 that are most affected by soot buildup. For example, if there is a greater amount of soot buildup on rear portions of the DOC 122 than on front portions, increasing exhaust temperature would not be an effective regeneration strategy because the hot exhaust would most directly affect the front portions of the DOC 122, which do not need regeneration in this example.

Similarly, the principles and methods discussed herein are also applicable to generating an axially resolved model of the DPF 121 that focuses on, for example, hydrocarbon (HC) buildup across portions of the DPF 121. In these HC-related embodiments, the monitored state is an amount of HC buildup, such that the monitored state for the modeled DPF 121 is the HC buildup quantity on each portion. The modeling circuit 220 develops and updates the axially resolved model of the DPF 121 based on sensed values from the sensor related to exhaust flow rate and pressure across portions of the DPF 121 (as HC buildup restricts flow and increases pressure). Accordingly, the commands issued by the predictor circuit 222 in these HC-related embodiments are primarily directed to thermal management commands (i.e., increasing the temperature of the exhaust gas passing through the aftertreatment system 120 in order to burn off the HC buildup). As discussed above with regard to the NOx-reduction and ammonia storage embodiments and to the soot-related embodiments, the predictor circuit 222 may leverage the added utility from modeling multiple portions of the DPF 121 in order to more effectively regenerate those portions of the DPF 121 that are most affected by soot buildup. For example, if there is a greater amount of soot buildup on front portions of the DPF 121 than on rear portions, increasing exhaust temperature would be an especially effective regeneration strategy because the hot exhaust would most directly affect the front portions of the DOC 122, which are the portions most in need of regeneration in this example.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining maybe stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the modeling circuit 220, the predictor circuit 222, and the corrector circuit 224 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A system comprising:
an aftertreatment system; and
a controller coupled to the aftertreatment system, the controller configured to:
generate a spatially resolved model of a catalyst of the aftertreatment system, the spatially resolved model dividing the catalyst into one or more portions; and
adjust the spatially resolved model based on one or more sensed values from at least one sensor upstream of the one or more portions and at least one sensor downstream of the one or more portions, wherein the catalyst is a first Selective Catalytic Reduction (SCR) catalyst, and wherein the aftertreatment system includes a second SCR catalyst positioned upstream of the first SCR catalyst.

2. The system of claim 1, wherein the controller is further configured to:
compare one or more modeled values from the spatially resolved model to one or more desired values for the aftertreatment system; and
in response to the comparison, command at least one of an engine, a heater, or a doser of the aftertreatment system to achieve the one or more desired values.

3. The system of claim 2, wherein adjusting the spatially resolved model, the controller is further configured to:
determining a gradient between the one or more sensed values from the at least one sensor upstream of the one or more portions and the one or more sensed values from the at least one sensor downstream of the one or more portions; and
assigning, based on the determined gradient, new modeled values to the one or more portions.

4. The system of claim 1, wherein the controller is further configured to:
compare one or more modeled values from the spatially resolved model to one or more desired values for the catalyst; and
identify a fault in the aftertreatment system based on a difference between the one or more modeled values and the one or more desired values exceeding an error threshold.

5. The system of claim 1, wherein the first SCR catalyst is a combination of a Selective Catalytic Reduction (SCR) catalyst and an Ammonia Oxidation Catalyst (AMOX).

6. The system of claim 1, wherein the second SCR catalyst is relatively smaller than the first SCR catalyst.

7. The system of claim 1, further comprising a first reductant doser fluidly coupled to the first SCR catalyst and a second reductant doser fluidly coupled to the second SCR catalyst.

8. The system of claim 7, wherein the controller is further configured to:
control a dosing command for the first reductant doser based on one or more modeled values of the spatially resolved model for the first SCR catalyst and a spatially resolved model for the second SCR catalyst.

9. The system of claim 8, wherein the one or more modeled values are indicative of an amount of stored ammonia for one or more portions of the first SCR catalyst and the second SCR catalyst, and wherein the dosing command for the first reductant doser is based on a comparison of the one or more modeled values indicative of the amount of stored ammonia of the one or more portions of the first SCR catalyst and the second SCR catalyst to an ammonia storage threshold.

10. The system of claim 7, wherein the controller is further configured to:
control a dosing command for the second reductant doser based on one or more modeled values of the spatially resolved model for the first SCR catalyst and the spatially resolved model for the second SCR catalyst.

11. The system of claim 10, wherein the one or more modeled values are indicative of an amount of stored ammonia for one or more portions of the first SCR catalyst and the second SCR catalyst, and wherein the dosing command for the second reductant doser is based on a comparison of the one or more modeled values indicative of the amount of stored ammonia of the one or more portions of the first SCR catalyst and the second SCR catalyst to an ammonia storage threshold.

12. A method comprising:
generating, by a controller coupled to an aftertreatment system, a spatially resolved model of a catalyst of the aftertreatment system, the spatially resolved model dividing the catalyst into one or more portions; and
adjusting, by the controller, the spatially resolved model based on one or more sensed values from at least one sensor upstream of the one or more portions and at least one sensor downstream of the one or more portions, wherein the catalyst is a first Selective Catalytic Reduction (SCR) catalyst, and wherein the aftertreatment system includes a second SCR catalyst positioned upstream of the first SCR catalyst.

13. The method of claim 12, further comprising:
comparing, by the controller, one or more modeled values from the spatially resolved model to one or more desired values for the aftertreatment system; and
in response to the comparison, commanding, by the controller, at least one of an engine, a heater, or a doser of the aftertreatment system to achieve the one or more desired values.

14. The method of claim 13, wherein adjusting the spatially resolved model comprises:
determining, by the controller, a gradient between the one or more sensed values from the at least one sensor upstream of the one or more portions and the one or more sensed values from the at least one sensor downstream of the one or more portions; and
assigning, by the controller, based on the determined gradient, new modeled values to the one or more portions.

15. The method of claim 12, further comprising:
comparing, by the controller, one or more modeled values from the spatially resolved model to one or more desired values for the catalyst; and
identifying, by the controller, a fault in the aftertreatment system based on a difference between the one or more modeled values and the one or more desired values exceeding an error threshold.

16. A system, comprising:
a processing circuit comprising at least one processor coupled to a memory, the memory storing instructions therein that, when executed by the at least one processor, cause the processing circuit to:
generate a spatially resolved model of a catalyst of an aftertreatment system, the spatially resolved model dividing the catalyst into one or more portions; and
adjust the spatially resolved model based on one or more sensed values from at least one sensor upstream of the one or more portions and at least one sensor downstream of the one or more portions, wherein the catalyst is a first Selective Catalytic Reduction (SCR) catalyst, and wherein the aftertreatment system includes a second SCR catalyst positioned upstream of the first SCR catalyst.

17. The system of claim 16, wherein the instructions, when executed by the at least one processor, further cause the processing circuit to:
   compare one or more modeled values from the spatially resolved model to one or more desired values for the aftertreatment system; and
   in response to the comparison, command at least one of an engine, a heater, or a doser of the aftertreatment system to achieve the one or more desired values.

18. The system of claim 17, wherein the instructions, when executed by the at least one processor, further cause the processing circuit to:
   determine a gradient between the one or more sensed values from the at least one sensor upstream of the one or more portions and the one or more sensed values from the at least one sensor downstream of the one or more portions; and
   assign, based on the determined gradient, new modeled values to the one or more portions.

* * * * *